UNITED STATES PATENT OFFICE.

ARNOLD S. WAHL, OF CHICAGO, ILLINOIS, ASSIGNOR TO THE WAHL EFFICIENCY INSTITUTE, OF CHICAGO, ILLINOIS, A CORPORATION OF ILLINOIS.

BREAD MANUFACTURE.

1,242,396.      Specification of Letters Patent.      Patented Oct. 9, 1917.

No Drawing.      Application filed January 11, 1916. Serial No. 71,483.

*To all whom it may concern:*

Be it known that I, ARNOLD S. WAHL, a citizen of the United States, residing at Chicago, in the county of Cook and State of Illinois, have invented a new and useful Improvement in Bread Manufacture, of which the following is a specification.

My invention has to do with the manufacture of bread, or the like baked-food products.

The object of the invention is to improve the quality of the bread by using for the mixing of the dough a water containing considerable quantities of dissolved substances which are valuable in themselves or by reason of their stimulating and invigorating effect upon the yeast. As examples of such substances the following may be mentioned: calcium, magnesium, potassium, ammonia, phosphates and other salts.

The effect of the ingredients mentioned is well known, since they are recognized as capable of stimulating the yeast to increased production. It is also known that for the development of protoplasm, the food supplied to the yeast must be in soluble form. The flour itself contains some of the ingredients specified (such as phosphates and potassium salts, albumin and starch), but they are in such condition as to be difficultly soluble and therefore ineffective in this measure. The same ingredients when previously dissolved in the water employed in mixing the dough are, however, in a condition to be most readily assimilated by the yeast and are fully effective to produce the utmost stimulation of which they are capable, while ammonia salts added to the water will readily take the place of and for the same reason will be more effective than the amino bodies or peptones of the flour as yeast food constituents.

It has hitherto been common to add to and mix with the flour various solid substances, among them being some of those mentioned above, with the purpose and object of improving the bread by providing additional food for the yeast. The ingredients so added, however, like those naturally contained in the flour are not in fit condition to be readily assimilated, nor does the subsequent addition of water to and kneading of the dough rectify this condition. It is difficult to effect thorough intermixture of solids, and moreover the added ingredients are at no time so thoroughly wetted as to really go into solution and become ionized and permeate the mass as is necessary for their maximum efficiency.

By supplying the improvers as dissolved components of the baking water instead of mixing them with the flour, a considerable improvement is therefore effected, both as to simplicity of operation and consequent lessening of cost, and as to improvement in quality of the bread, since the solution of these various ingredients in the water effects an absolutely uniform distribution and thoroughly permeates the dough and gives an assurance which no other method of procedure can give so that the improvers are completely dissolved and ionized and 100 per cent. assimilable by the yeast.

It has been known to attempt the improvement of baking waters by the addition of lime in order to rectify excessive hardness of the water caused by carbonates of calcium and magnesium, in the well-known manner used in treating boiler-feed water, but this process instead of supplying lime to the water merely results in a chemical action by which a precipitation is effected.

Where calcium sulfate is to be used for treating the water, I prefer to make use of freshly precipitated calcium sulfate prepared according to the patent of Robert Wahl, No. 1,156,448, of Oct. 12, 1915, this product being much more easily and perfectly dissolved than any other form of the compound with which I am familiar.

My improved process is applicable not only to bread but to all similar baked farinacious foods the dough of which is mixed with water, and it is therefore to be understood that in the claim appended hereto the term "bread" is intended to include this class of foods.

What I claim as new and desire to secure by Letters Patent is:

In the process of making bread the step of dissolving in the baking water before adding the same to the dough, the wholly and readily soluble paste-like precipitated calcium sulfate prepared according to the patent to Robert Wahl, No. 1,156,448, of October 12, 1915.

ARNOLD S. WAHL.

In presence of—
A. C. FISCHER,
C. C. BREUER.